United States Patent [19]

Evans

[11] 3,716,417
[45] Feb. 13, 1973

[54] PROFILE THERMOCOUPLE
[75] Inventor: Harry T. Evans, Philadelphia, Pa.
[73] Assignee: Pyco, Inc., Penndel, Pa.
[22] Filed: Dec. 24, 1970
[21] Appl. No.: 101,220

[52] U.S. Cl. ....................136/232, 136/224, 136/231
[51] Int. Cl. ..............................................H01v 1/02
[58] Field of Search......................136/230–233, 235, 136/234, 242, 224, 227; 73/359

[56] References Cited

UNITED STATES PATENTS

| | | | |
|---|---|---|---|
| 2,796,455 | 6/1957 | Jones | 136/232 X |
| 3,393,101 | 7/1968 | Kirkpatrick | 136/224 |
| 1,633,599 | 6/1927 | Moeller | 136/230 X |
| 3,477,122 | 11/1969 | Hamrick | 136/233 X |
| 2,012,465 | 8/1935 | Godecke | 136/232 X |
| 3,097,973 | 7/1963 | Wieszeck | 136/234 |
| 3,015,234 | 1/1962 | Springfield | 136/232 X |

FOREIGN PATENTS OR APPLICATIONS

| | | | |
|---|---|---|---|
| 854,570 | 11/1960 | Great Britain | 136/233 |
| 1,090,737 | 11/1967 | Great Britain | 136/233 |

OTHER PUBLICATIONS

"Temperature", by the American Institute of Physics, 1941, pp. 888–890.

Primary Examiner—Carl D. Quarforth
Assistant Examiner—Harvey E. Behrend
Attorney—Caesar, Rivise, Bernstein & Cohen

[57] ABSTRACT

A profile thermocouple is provided for measuring temperature at a plurality of spaced points preferably in a diffusion furnace. The thermocouple includes a thermocouple lead of a first polarity and three thermocouple leads of a second polarity. Each of the leads of the second polarity are connected to the thermocouple lead of the first polarity at junctions which are spaced along the length of the lead of the first polarity so that the junctions formed at the three points enable measurement of temperature at each of these positions.

3 Claims, 5 Drawing Figures

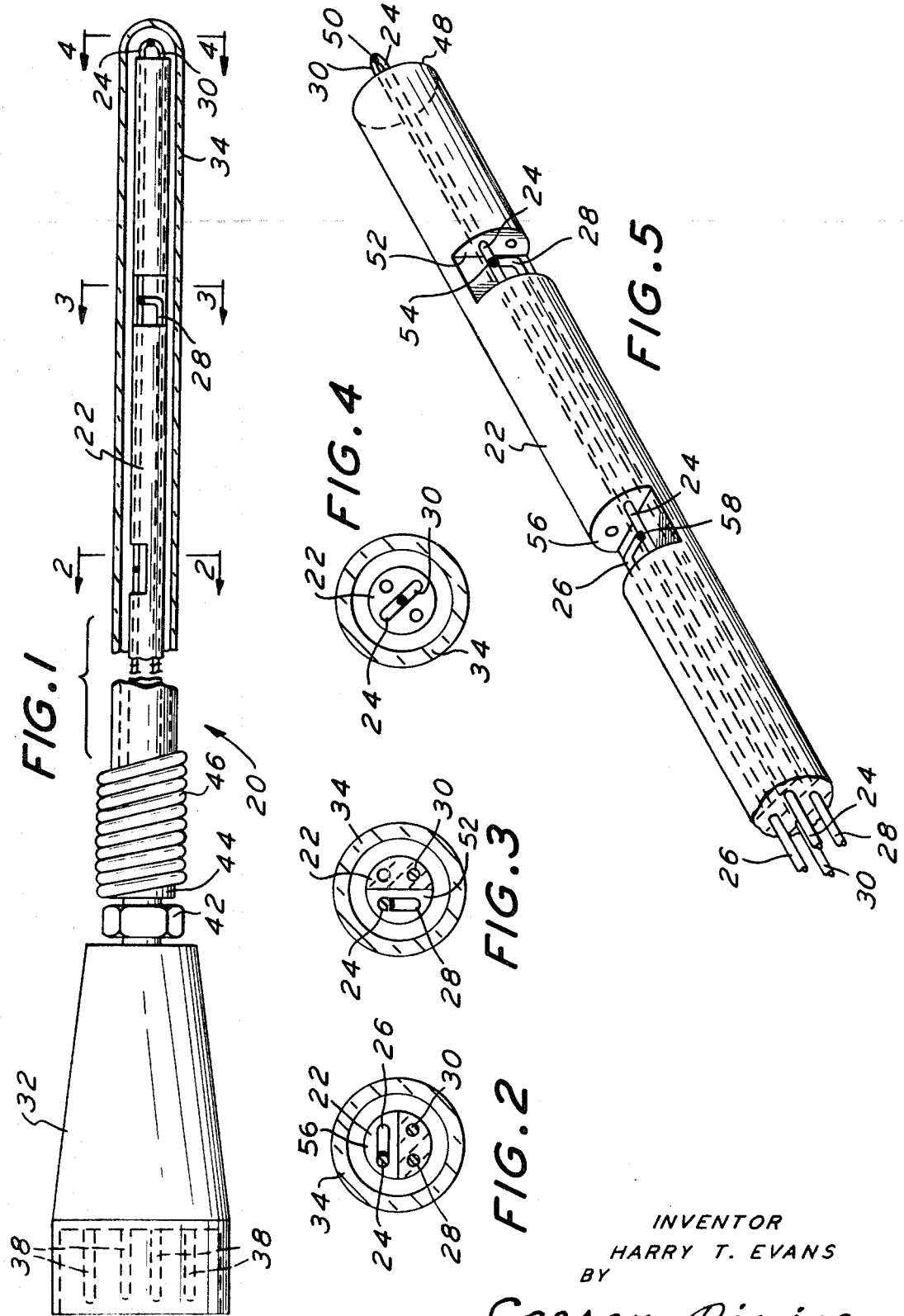

PROFILE THERMOCOUPLE

This invention relates generally to thermocouples and more particularly to a profile thermocouple which is particularly adapted for diffusion furnaces.

The diffusion furnace is among the most critically controlled portions of the diffusion process in the production of semiconductors and integrated circuits. A diffusion furnace is operated in the critical range between 800° and 1300° C. During the operation in this range, sensing of the temperature must be extremely accurate, sensitive and reproducible (stable). Accordingly, the temperature indicating instrument must also be similarly accurate.

In the diffusion furnace, the temperature must be measured at a plurality of spaced points. In the present state of the art, a profile thermocouple which is of an elongated nature is inserted into the diffusion furnace with the junction of the thermocouple being moved to each of the points at which the temperature measurements must be made. Because the prior profile thermocouple included only a single thermocouple junction, it will, for the purpose of this application, be referred to as the single element profile thermocouple. While the single element profile thermocouple did provide the accuracy, sensitivity and stability required, another parameter arose in the diffusion process which became equally important, namely, uniformity. That is, with the single element profile, the loading of the diffusion furnace is not constant during the profiling operation. That is, the mass of the profile thermocouple itself caused an unequal or non-uniform load in the diffusion furnace as the thermocouple was moved in and out of the furnace for taking temperature readings at spaced points therein.

In addition to the lack of uniformity, the single element profile thermocouple had to be moved physically during the profile check. Thus, there was a variation in the load which the furnace saw during the profile check.

Accordingly, it is the object of this invention to overcome the aforementioned disadvantages of the profile thermocouple.

Another object of the invention is to provide a new and improved profile thermocouple which includes a plurality of thermocouple measuring junctions for determining the temperature at a plurality of spaced points.

Yet another object of the invention is to provide a profile thermocouple which need not be physically moved during the profile check.

Yet another object of the invention is to provide a new and improved profile thermocouple which will not cause a variation in the load during the profile check of the diffusion furnace.

Yet another object of the invention is to provide a new and improved profile thermocouple wherein there is no instrument or thermocouple reference junction error possible.

These and other objects of the invention are achieved by providing a profile thermocouple for measuring temperature at a plurality of spaced points. The thermocouple includes a thermocouple lead of a first polarity and a plurality of thermocouple leads of a second polarity. Each of the leads of the second polarity are connected to the thermocouple lead of the first polarity. The junctions between each of the leads of the second polarity are spaced along the length of the lead of the first polarity.

Other objects and many of the attendant advantages of this invention will be readily appreciated as the same becomes better understood by reference to the following detailed description when considered in connection with the accompanying drawings wherein:

FIG. 1 is a side elevational view of a profile thermocouple embodying the invention with a portion of the protection tube shown in vertical section for purposes of clarity;

FIG. 2 is an enlarged sectional view taken along the line 2—2 in FIG. 1;

FIG. 3 is an enlarged sectional view taken along the line 3—3 in FIG. 1;

FIG. 4 is an enlarged sectional view taken along the line 4—4 in FIG. 1; and

FIG. 5 is an enlarged fragmentary perspective view of the thermocouple leads mounted in the insulating rod.

Referring now in greater detail to the various figures of the drawings wherein like reference numerals refer to like parts, a profile thermocouple embodying the invention is shown generally at 20 in FIG. 1.

Basically, the thermocouple profile comprises an insulating rod 22 having a plurality of thermocouple leads 24, 26, 28 and 30 mounted therein, a male connector 32 and a protection tube or sheath 34. The connector 32 includes a plurality of male contact pins which are electrically connected to the leads 24 to 30 of the thermocouple. The insulating rod is compression fit to the male connector 32. A first collar 42 is provided on the insulating rod 22 to enable the compression fitting between the rod and the connector 32. A second collar 44 is provided adjacent collar 42 on the insulating rod 22. The insulating sheath 34 is removably connected to collar 44 by a spring 46.

That is, the collar 44 includes a recessed or reduced portion over which the quartz tube fits between the spring and the reduced portion. The spring 46 is twisted about its longitudinal axis to enable loosening and tightening of the same to maintain the tube on collar 44.

As best seen in FIG. 5, thermocouple lead 24 extends longitudinally through insulating rod 22 from one end to the other. As also seen in FIG. 5, the thermocouple lead 34 extends and projects beyond the end 48 of the insulating rod 22. Similarly, the thermocouple lead 30 also extends through the entire length of the insulating rod 22 and projects beyond end 48 and, as best seen in FIGS. 4 and 5, is connected to thermocouple lead 24 at junction 50. It should be noted that four longitudinally extending openings are provided in the insulating rod with each of the thermocouple leads being telescoped into the openings.

The insulating rod 22 also includes a first notch 52 which is spaced from end 48. The notch 52 is so disposed that thermocouple leads 24 and 28 are both exposed and, as best seen in FIGS. 3 and 5, are joined thereat at junction 54. The insulating rod 22 further includes a second notch 56 which is so disposed that the thermocouple lead 24 and 26 are exposed and, as best seen in FIGS. 2 and 5, are joined thereat at junction 58.

It can, therefore, be seen that three thermocouple junctions are formed with thermocouple lead 24 being common to each of the three thermocouple junctions. Accordingly, the thermocouple lead 24 is of a first polarity and each of the leads 26, 28 and 30 are of a second polarity so that a temperature responsive thermocouple junction is formed at each of the junctions 50, 54 and 58.

The thermocouple lead 24 is preferably of a positive polarity and comprised of a 70 percent platinum – 30 percent rhodium alloy which provides a uniform ductile homogeneous conductor. Thermocouple leads 26, 28 and 30 are preferably negative polarity leads which are comprised of 94 percent platinum and 6 percent rhodium alloy which is also a uniform ductile homogeneous conductor.

The insulating rod 22 is preferably comprised of a hard fire 99 percent alumina. The protection tube 34 is preferably comprised of clear quartz. The spring 46 which is utilized to releasably secure the quartz tube 34 to the collar 44 is preferably comprised of incanel.

The three junctions 50, 54 and 58 are preferably spaced at 11 inch intervals so that junction 54 is spaced 11 inches from junction 50 and junction 58 is spaced 22 inches from junction 50. As best seen in FIGS. 2 and 3, the notches 52 and 56 are provided in the insulating rod 22 at substantially right angles with respect to each other. Thus, at notch 56, only the thermocouple leads 24 and 26 are exposed so that the two leads can be joined without affecting the remaining leads 28 and 30. At notch 52, only thermocouple leads 24 and 28 are exposed so that the junction 54 can be formed without affecting either of the remaining leads 26 and 30.

Finally, at the end 48 of the insulating rod, only conductor leads 24 and 30 extend that far and, accordingly, are the only leads that are joined thereat. The insulating rod 22, in addition to enabling the junction of the four leads at three different junctions, also facilitates insulation between the three junctions.

The male connector 32 enables the connection of external circuitry to the leads 24 through 30 so that external volt meters and other equipment can be connected thereto for determining the temperature at each of the junctions. In order to determine the temperature at junction 50, the external circuitry is connected to the leads 24 and 30. In order to determine the temperature at junction 54, the external circuitry is connected to leads 24 and 28 and to determine the temperature at junction 58, the external circuitry is connected to leads 24 and 26. The three pairs of leads are preferably connected to circuitry in sequence to provide a profile check.

It can, therefore, be seen that a new and improved profile thermocouple has been provided. The new profile thermocouple enables the quartz protecting sheath 34 to be inserted into a diffusion furnace to measure the temperature at three distinct positions within the furnace.

Moreover, because a plurality of thermocouple junctions are provided in the profile thermocouple, there is no longer a need for physically moving the profile thermocouples during the profile check. That is, it is necessary only to electrically connect the necessary volt meters or other measuring devices across first thermocouple leads 24 and 26, then across thermocouple leads 24 and 28 and then across thermocouple leads 24 and 30. Because there is no moving of the profile thermocouple, there is no variation in the load which the furnace sees during the profile check.

Finally, the use of a single positive junction which is common to three negative junctions enables the elimination of the requirement for six leads to provide three thermocouple junctions. Accordingly, the insulating rod 22 can be made of a very small diameter to accommodate only the four thermocouple leads and the expense of two additional thermocouple leads is eliminated.

Without further elaboration, the foregoing will so fully illustrate my invention that others may, by applying current or future knowledge, readily adapt the same for use under various conditions of service.

What is claimed as the invention is:

1. A profile thermocouple for measuring temperature at a plurality of spaced points, said thermocouple including a thermocouple lead of a first polarity and a plurality of thermocouple leads of a second polarity, each of said leads of said second polarity being connected to said thermocouple lead of said first polarity, the junctions between each of said leads of said second polarity being spaced along the length of said lead of said first polarity and a solid insulating rod is provided for housing said thermocouple leads, each of said thermocouple leads extending longitudinally of and through said insulating rod and being spaced from the other of said leads along substantially the entire length of said leads by said insulating material comprising said insulating rod, said thermocouple leads each extending parallel to each other, the lead of said first polarity and one of the plurality of said second polarity being connected at one end of said insulating rod to form a first thermocouple junction, said insulating rod including at least one notch which exposes said thermocouple of said first polarity and a second one of said plurality of thermocouple leads of said second polarity so that a second junction can be formed in said notch, said remaining leads being spaced by said insulation from said junction in said notch.

2. The profile thermocouple of claim 1 wherein said insulating rod includes a second notch which acts to expose said thermocouple lead of said first polarity and a third one of said leads of said second polarity so that a thermocouple junction is formed in said second notch.

3. The profile thermocouple of claim 1 wherein a protection sheath is provided over said insulating rod, said protection sheath being connected to a cylindrical collar at one end of said thermocouple by a coil spring which is coupled to the outer surface of said sheath.

* * * * *